United States Patent

Nichols et al.

[15] 3,688,431
[45] Sept. 5, 1972

[54] TROLLER

[72] Inventors: Edgar B. Nichols, 325 W. Main St., Moorestown, N.J. 08057; J. Howard Cundiff, Jr., 1365 Paddock Way, Cherry Hill, N.J. 08034

[22] Filed: Nov. 13, 1970

[21] Appl. No.: 89,378

Related U.S. Application Data

[63] Continuation-in-part of Ser. No. 836,484, June 25, 1969, abandoned.

[52] U.S. Cl. ............................43/43.14, 43/44.88
[51] Int. Cl. .........................A01k 91/00, A01k 95/00
[58] Field of Search.....43/43.14, 44.88, 44.91, 44.93

[56] References Cited

UNITED STATES PATENTS

| | | | |
|---|---|---|---|
| 2,654,177 | 10/1953 | Cope et al. | 43/44.88 |
| 717,237 | 12/1902 | Marsters | 43/44.88 |
| 2,230,456 | 2/1941 | Henze | 43/43.14 |
| 2,226,331 | 12/1940 | Allison | 43/44.88 |
| 1,618,901 | 2/1927 | Woolman | 24/136.2 |
| 2,888,771 | 6/1959 | Stephens et al. | 43/44.88 X |

*Primary Examiner*—Samuel Koren
*Assistant Examiner*—J. F. Pitrelli
*Attorney*—Pennie, Edmonds, Morton, Taylor, Adams and John L. Sigalos

[57] ABSTRACT

An improved troller for use with a fishing line that is capable of being varied in weight and of releasing when the troller contacts the tip of a fishing rod. The troller has a hollow casing and a ball movably disposed therein, one portion of the casing interior being tapered for wedging and locking the line between the casing and the ball in response to the pull of the line, a second portion of the casing interior being enlarged for movably encasing the ball after the troller has been released from the line in response to its contact with the tip of the fishing rod, and a third portion of the casing interior having at least one weight removably mounted therein.

9 Claims, 3 Drawing Figures

PATENTED SEP 5 1972 3,688,431

INVENTORS
J. HOWARD CUNDIFF, JR. &
EDGAR B. NICHOLS

BY
Pennie Edmonds, Morton, Taylor, & Adams
ATTORNEYS

TROLLER

REFERENCE TO RELATED APPLICATION

This application is a continuation-in-part of application Ser. No. 836,484, filed June 25, 1969, entitled "-Troller,".

BACKGROUND OF THE INVENTION

Trolling is a fishing technique in which the lure or bait, attached to the end of a line, is towed behind a slowly moving boat. In the practice of this fishing technique a troller weight is added to the fishing line at one or several points therealong at a distance ahead of the lure to regulate the depth at which the lure on the line will be towed.

After a fish has been caught and the line is being reeled in, the troller no longer performs a useful function. In fact, after the line has been reeled in to where the troller is attached, the fisherman must stop reeling, reach out over the edge of the boat, grasp the line, place the rod in a holder and continue to retrieve by hand. This added procedure is not only inconvenient but also is a serious safety hazard. In the past, various attempts have been made to eliminate these problems; however, none has proved acceptable.

In addition, when it is desired to troll at a different depth the fisherman must either add to the line or remove therefrom troll weights or substitute a new troll weight to be able to place the lure at the new depth. A great deal of time is required in securing, removing, and/or substituting the troll weights, a task made more difficult by the wet line, and often requires that the lure, existing troll weight, and other devices fastened to the line be first removed.

SUMMARY OF THE INVENTION

This invention contemplates a troller for use with a fishing line passing therethrough, comprising a casing having a hollow interior cavity and apertures at each end which communicate with the cavity, a ball movably disposed in said cavity, said cavity having a locking chamber at one end thereof in which said ball may be wedged, a support chamber at the other end having at least one weight removably mounted therein, and a release chamber in which said ball is free to move, said chambers being in communication, said locking chamber and said ball adapted to wedge the fishing line therebetween when the line is pulled through the cavity in the direction of the locking chamber, and said release chamber adapted to freely encase and retain the ball when the casing is moved in the same direction.

This invention eliminates the problems associated with devices of the prior art by providing an improved troller which is capable of automatically releasing itself from the fishing line at a desired time, thereby allowing itself to quickly and efficiently slide down the fishing line and out of contact with the fishing rod. With such a device it is possible to completely reel in the fish without the need to hand line retrieve. It also permits adjustment of the depth of trolling without removal of the troller from the line to which it is attached.

It has also been found that the particular interior arrangement of the elements that make up this invention eliminates the likelihood of the troller relocking once it has been disengaged from the line during the normal fishing operation of reeling in the fish.

A further understanding of the objects and advantages will become apparent upon careful consideration of the preferred embodiment.

DESCRIPTION OF THE PREFERRED EMBODIMENT

Figure 1:
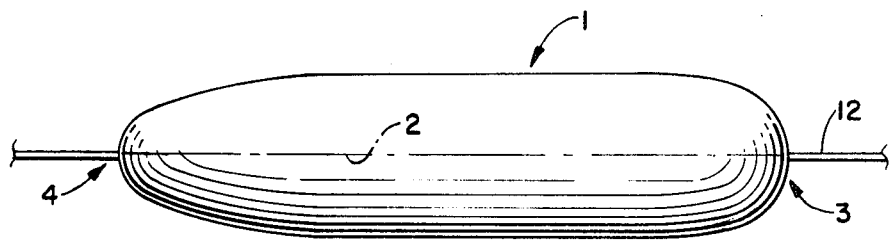
FIG. 1 is a side elevation of the troller.

Referring to FIG. 1, the troller of this invention consists of a casing 1 whose exterior surface is generally cylindrical or spheroidal in shape, arranged about a longitudinal axis 2. The casing 1 has an anterior end 3 and a posterior end 4. The anterior end 3 is more rounded in shape than the posterior end 4 which is preferably tapered in dimension. The particular exterior surface of the casing 1 has been constructed to facilitate the passage of the troller smoothly through the water during the trolling operation.

Figure 2:
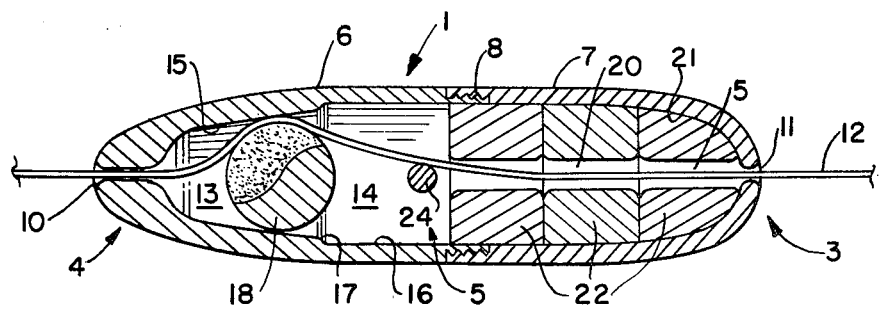
FIG. 2 is a side elevation of the troller shown in section illustrating the troller in a locked position.

Referring to FIG. 2, the casing 1 of the troller is provided with an interior cavity, generally indicated by 5, which is divided into a first section 6 and a second section 7 that are engageable with each other by threads 8.

An aperture 10 is situated at the posterior end 4 of the casing 1 so as to provide communication with the interior cavity 5 of the first section 6 while an aperture 11, positioned at the anterior end 3 of the casing communicates with the interior cavity 5 of the second section 7 of the casing 1. The aperture 10, interior cavity 5 and aperture 11 provide a passageway that enables a fishing line 12 to be completely threaded through the interior of casing 1.

The cavity 5 of the first section 6 is provided with a locking chamber 13 and a release chamber 14 positioned adjacent thereto. The locking chamber 13 communicates with the aperture 10 in the posterior end 4 of the casing 1 and is provided with a frusto-conical shaped interior wall 15 which tapers towards the aperture 10.

The release chamber 14, on the other hand, is provided with a generally cylindrical interior wall 16 whose surface is joined to the surface of the locking chamber 13 by an edge 17 which is beveled toward the posterior end 4 of the casing 1. The perpendicular distance between the axis 2 of the troller and the release chamber interior wall 16 is greater than the same distance between the axis 2 and the locking chamber interior wall 15 and edge 17.

Positioned within the interior cavity 5 of the first section 6 is a ball 18, preferably having a roughened outer surface to increase its frictional engagement. The ball 18 is of such a size and shape that it is adapted to move freely within the release chamber 14 but adapted to become wedged in the locking chamber 13 as it is moved toward the posterior end 4 of the casing 1. Further, the beveled edge 17 is so arranged to partially limit the movement of the ball 18 within the interior cavity 5 as will be hereinafter explained.

The interior cavity 5 of the second section 7 is provided with a support chamber 20 having a generally cylindrical wall 21 that is tapered toward the anterior end 3 of casing 1. Mounted in the support chamber 20 are weights 22. Three weights 22 are shown, and of these 1, 2 or 3 can be removably mounted in support chamber 20. The weight or weights 22 closest to the anterior end 3 can be permanently affixed in the cavity if desired. Each of the weights has a central opening 23 therein, best illustrated in FIG. 3, to permit passage of line 12 therethrough.

A rod 24 is placed longitudinally across the interior cavity 5 of the first section 6 at a point between the threads 8 which are used to engage first section 6 and second section 7 such that the ball 18 is held loosely in the release chamber 14. The rod 24 is placed so as to restrain ball 18 from egress from the first section 6 when section 6 and section 7 are separated, but the rod 24 does not prevent the easy passage of line 12 over ball 18. Rod 24 prevents ball 18 from accidentally egressing from section 6 during separation and keeps the weights 22 in the support chamber 20. By use of this restraining rod the ball cannot become lost or mislaid.

Figure 3:
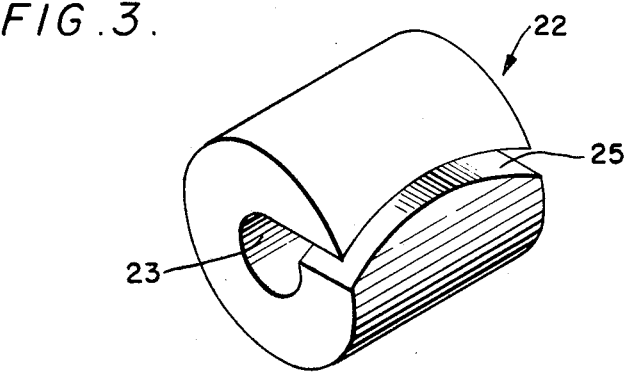
FIG. 3 is a perspective view of a removable weight used in the troller shown in FIG. 2.

There is shown in FIG. 3 a removable weight 22 that is cylindrical in shape which has a central opening 23 and an arcuate slot 25 through the side thereof extending from the outer surface of the weight to the central opening 23.

Referring now to the operation of the novel troller of this invention, the ball 18 is situated within the release chamber 14 of the casing 1 when the troller is inactive. To attach the troller to the fishing line 12, the line 12 is first simply threaded through the passageway in the casing 1 provided by aperture 11, the central openings 23 in weights 22, interior cavity 5, and aperture 10 and the posterior end 4 of the casing is tipped downwardly.

The troller can also be attached to fishing line 12, by separating the troller into two parts 6 and 7. When this means of threading is chosen, the sections are separated. Section 7 is threaded by passing line 12 through the aperture 11, central openings 23 in weights 22 and the chamber 5. Then line 12 will then pass into section 6, past bar 24, into the release chamber 14 containing the ball 18, between the ball 18 and the interior cavity walls 16, and into the empty lock chamber 13. In section 6 the line 12 is passed through the remainder of the lock chamber 13, and passes out of this section of the troller through aperture 10. The two sections, now independently threaded by line 12, are then reengaged by threads 8. Once the troller is threaded, it is then locked to the fishing line 12 by pulling the line 12 in a direction from the anterior end 3 to the posterior end 4 of the casing 1 opposite to the direction indicated by the arrow 21 carried by the casing 1 in FIG. 1. As the line 12 moves in this direction, the ball 18 is moved by the line 12 until the ball 18 becomes wedged into the locking chamber 13, thereby pinning the fishing line 12 therebetween. The roughened surface on the ball 18 increases the frictional grip of the ball 18 in contact with the locking chamber interior wall 15 and the fishing line 12.

The troller is now fixedly anchored to the fishing line 12 and ready for use in the normal trolling operation after an appropriate lure is attached to the end of the fishing line exiting through aperture 10.

When a fish has been caught and it is desired to reel it in, the troller will be automatically released from its locked position when its anterior end 3 comes in contact with the tip of the fishing rod. Any contact with the rod will force the troller to move toward the lure in the opposite direction as that indicated by the arrow in FIG. 1. This movement of the troller will dislodge the ball 18 from its locked position within the locking chamber 13 and the ball 18 will roll down over the beveled ridge 17 into the release chamber 14 where it is free to move about. The beveled edge 17 limits the free movement of the ball 18 within the release chamber 14 thereby preventing it from rolling back into the tapered locking chamber 13 where it might rewedge the fishing line 12 against the interior wall 15 of the locking chamber 13.

It has been found that the weights 22 in the support chamber 20 in the anterior end 3 of the casing 1 enable the anterior end 3 to be tilted downwardly as the troller slides down the fishing line 12 toward the lure after it has been released by contact with the tip of the fishing rod as shown in FIG. 4. This resulting position of the troller aids in preventing the ball 18 from rolling back into the locking chamber 13 to relock the troller about the fishing line 12. Also this particular weighting technique enables the troller to be pulled smoothly through the water during the trolling operation.

More importantly, once the troller is attached to the line 12 as described, weights 22 can be added or removed to vary the depth of the troll without removing the troller from the line. The troller parts 6 and 7 are separated by unscrewing and weight 22 added or removed by inserting or withdrawing the line 12 from the central opening 23 thereof through the arcuate slot 25. The troller with the additional or remaining weights is then reassembled by screwing parts 6 and 7 together. Thus, the troller need not be removed from the line to effect a weight change to secure a change in trolling depth.

The slot 25 is preferably of an arcuate shape to prevent accidental movement of line 12 from central opening 23 to a position between the weight 22 and wall 21 resulting in possible wedging of the line therebetween.

While the particular angle of the tapered inner wall 15 of the locking chamber 13 is not critical, it has been found that an angle of 5° with the longitudinal axis 2 is preferred.

It is to be understood that the particular size of the troller is also not significant since this feature is dependent only upon the type of fishing for which it is to be used. For example, when it is to be used in fresh water trolling, a troller smaller in size would be desired than would ordinarily be suitable for deep sea trolling.

Also, the particular shape of the interior cavity 5 of the casing 1 might be modified and still be within the scope of this invention. For example, the interior walls may possess a square, hexagonal, pentagonal, etc., cross section and still accomplish the purpose of this invention.

In addition, the number of weights used, including those having arcuate slots to permit removal or insertion of the weight while the troller is attached to the line, can be varied widely.

From the above it is apparent that the troller of this invention eliminates the undesirable need for the fisherman to reach out of the boat for the fish line and pull it in by hand. Not only is it possible for the fisherman to easily fall out of his boat under these circumstances but the possibility of his hand becoming cut by the fishing line is greatly increased. The fully automatic troller of this invention effectively eliminates all of these problems.

Having thus described the invention, with particular reference to the preferred forms thereof, it shall be obvious to those skilled in the art to which this invention pertains that various changes and modifications may be made therein without departing from the spirit and scope of the invention.

What is claimed is:

1. A troller for use with a fishing line passing therethrough comprising a casing having a hollow interior cavity and apertures at each end which communicate with the cavity, a ball movably disposed in said cavity, said cavity having a locking chamber at one end thereof in which said ball may be wedged, a support chamber at the other end having at least one weight removably mounted therein, and a release chamber spaced between said locking and support chambers in which said ball is free to move, said chambers being in communication, restraining means between said release and support chambers preventing movement of the ball into and movement of the weight out of the support chamber, said locking chamber and said ball adapted to wedge the fishing line therebetween when the line is pulled through the cavity in the direction of the locking chamber, and said release chamber adapted to freely encase and retain the ball when the casing is moved in the same direction.

2. The troller of claim 1 wherein said ball is provided with a roughened surface.

3. The troller of claim 1 including at least one weight removably mounted in said release chamber, said weight having a central opening and an arcuate slot through the side thereof extending from the outer surface of the weight to the central opening.

4. A troller for use with a fishing line passing therethrough comprising a hollow casing having an exterior surface and interior walls, said exterior surface being generally spheroidal in shape about a longitudinal axis and a ball movably disposed within said casing, said casing having a first and a second section joined together, the first section being provided with an aperture at one end of said casing, said interior wall of the first section being provided with a tapered locking chamber and a release chamber, said locking chamber being tapered toward said aperture, said release chamber having a generally cylindrical shape, said second section provided with an aperture in the other end of said casing and having at least one weight removably mounted therein, said tapered locking chamber of said first section and said ball adapted to wedge said fishing line therebetween when said line is pulled in the direction from the interior of the casing toward the aperture in the first section, and said release chamber adapted to freely encase and retain the ball when the casing is moved in the same direction, restraining means in said first section located at that end of the said first section that is joined to said second section, said restraining means preventing movement of the ball out of said first section.

5. The troller of claim 4 including at least one weight removably mounted in said chamber having a central opening and an arcuate slot extending from the outer surface of the weight to the central opening.

6. The troller according to claim 4 wherein said first and second sections are threadably engaged.

7. The troller according to claim 6 wherein said ball is provided with a roughened surface.

8. The troller according to claim 7 wherein said restraining means is a rod traversing the longitudinal axis of said first section.

9. The troller according to claim 8 wherein there are at least two weights in said second section, each weight being removably mounted in said chamber and having a central opening and at least one having an arcuate slot extending from the outer surface thereof to said central opening.

* * * * *